(12) United States Patent
Hill

(10) Patent No.: US 10,177,804 B2
(45) Date of Patent: Jan. 8, 2019

(54) PORTABLE ELECTRONIC DEVICE ASSEMBLY

(71) Applicant: Jason Hill, Hercules, CA (US)

(72) Inventor: Jason Hill, Hercules, CA (US)

(*) Notice: Subject to any disclaimer, the term of this patent is extended or adjusted under 35 U.S.C. 154(b) by 0 days.

(21) Appl. No.: 15/942,940

(22) Filed: Apr. 2, 2018

(65) Prior Publication Data

US 2018/0323818 A1 Nov. 8, 2018

Related U.S. Application Data

(60) Provisional application No. 62/501,074, filed on May 3, 2017.

(51) Int. Cl.
| | |
|---|---|
| *H04M 1/00* | (2006.01) |
| *H04B 1/3888* | (2015.01) |
| *A45C 11/00* | (2006.01) |
| *H04M 1/02* | (2006.01) |
| *A45C 1/06* | (2006.01) |

(52) U.S. Cl.
CPC ............ *H04B 1/3888* (2013.01); *A45C 1/06* (2013.01); *A45C 11/00* (2013.01); *H04M 1/0202* (2013.01); *A45C 2011/002* (2013.01)

(58) Field of Classification Search
CPC ...... H04B 1/3888; H04M 1/0202; A45C 1/06; A45C 11/00; A45C 2011/00
USPC .................................. 455/575.1, 575.6, 575.8
See application file for complete search history.

(56) References Cited

U.S. PATENT DOCUMENTS

| | | | | |
|---|---|---|---|---|
| 8,599,547 | B2 * | 12/2013 | Richardson | ........... G06F 1/1626 361/679.3 |
| 8,757,376 | B2 * | 6/2014 | Azzoni | .................. A45C 11/00 206/320 |
| 8,923,938 | B2 * | 12/2014 | Coughlan | .............. A45C 15/00 455/575.8 |
| 8,978,886 | B2 * | 3/2015 | Ziemba | .................... A45C 1/04 206/320 |
| 9,049,283 | B1 * | 6/2015 | Kim | ........................ H04M 1/21 |
| 9,179,762 | B2 * | 11/2015 | Paugh | ..................... A45F 5/004 |
| 9,503,148 | B2 * | 11/2016 | Meyer | .................. H04B 1/3888 |
| 9,787,807 | B1 * | 10/2017 | Glickman | ............. G06F 1/1628 |

(Continued)

*Primary Examiner* — Sonny Trinh
(74) *Attorney, Agent, or Firm* — Foundation Patents; Richard Salles

(57) ABSTRACT

Apparatus and associated methods relate to an electronic device protection module configured with a casing adapted to cushion and removably retain the electronic device, a bi-fold component mechanically coupled with the casing, and a releasable electronic device accessory pouch attaching receptacle disposed in the bi-fold component. In an illustrative example, the electronic device may be a smartphone. The casing may be, for example, elastically deformable, cushioning the smartphone against impact. In some examples, the casing may be configured with openings or buttons to enable device operation. In some designs, the bi-fold component may be configured with pockets adapted to secure currency or cards. In some embodiments, the attaching receptacle may releasably attach an accessory pouch to the bi-fold component. Various examples may advantageously provide portable device protection and enhanced access to the user's device accessories, for example, protecting the user's device and storing the user's accessories in the accessory pouch.

11 Claims, 11 Drawing Sheets

(56) References Cited

U.S. PATENT DOCUMENTS

| | | | |
|---|---|---|---|
| 2007/0004450 A1* | 1/2007 | Parikh | G06F 1/1626 455/556.1 |
| 2014/0066142 A1* | 3/2014 | Gipson | H04B 1/3888 455/575.8 |
| 2016/0080024 A1* | 3/2016 | Wilson | H04M 1/18 455/575.8 |

* cited by examiner

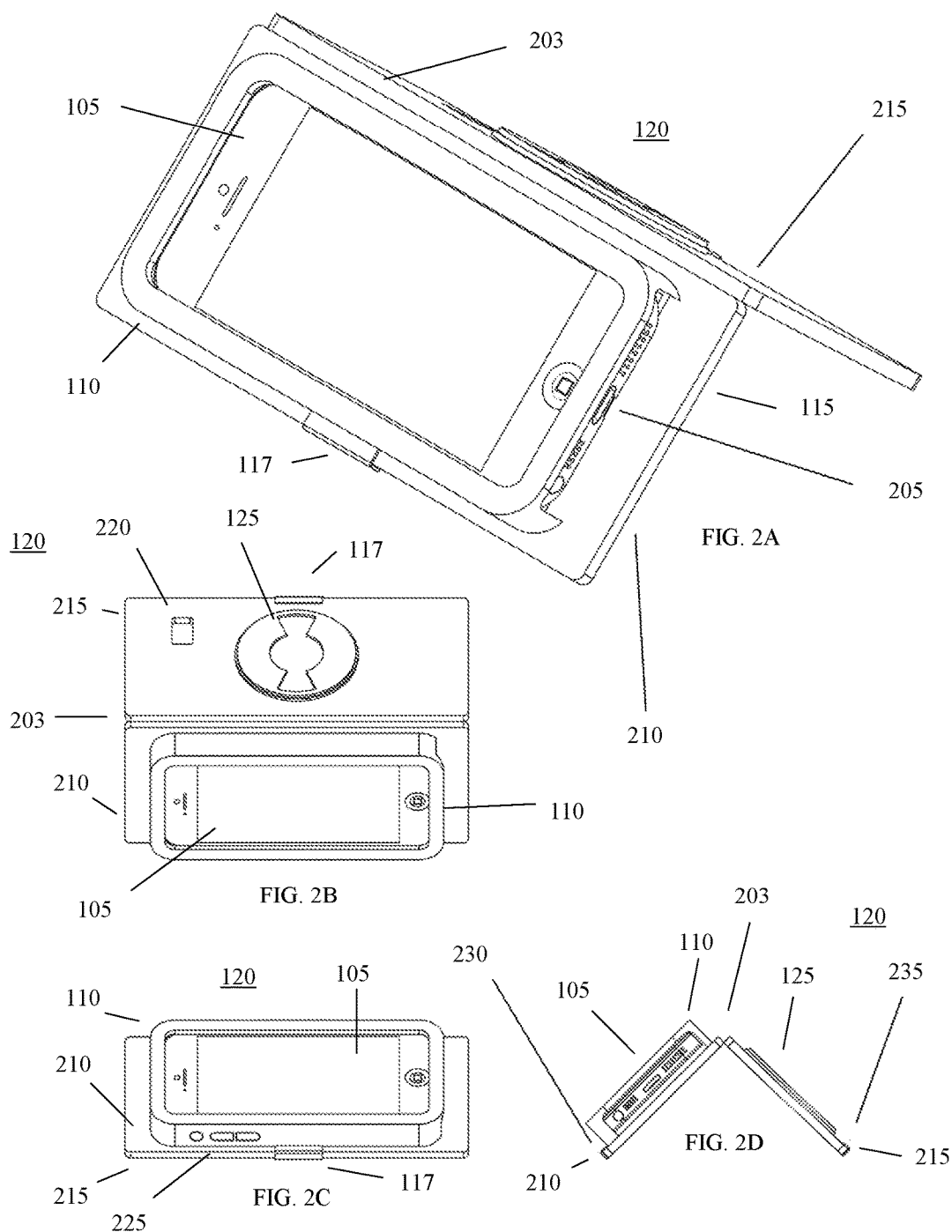

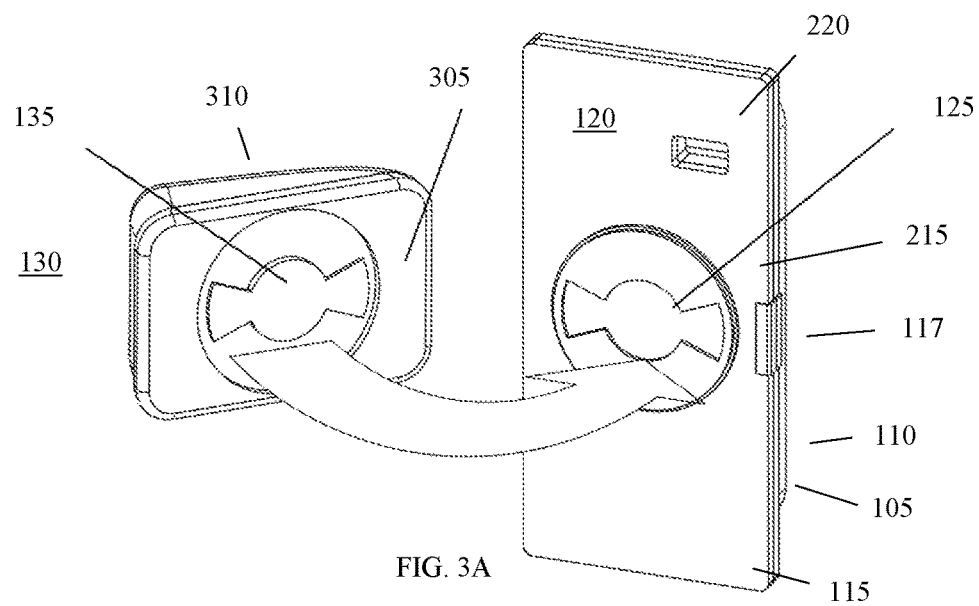
FIG. 3A
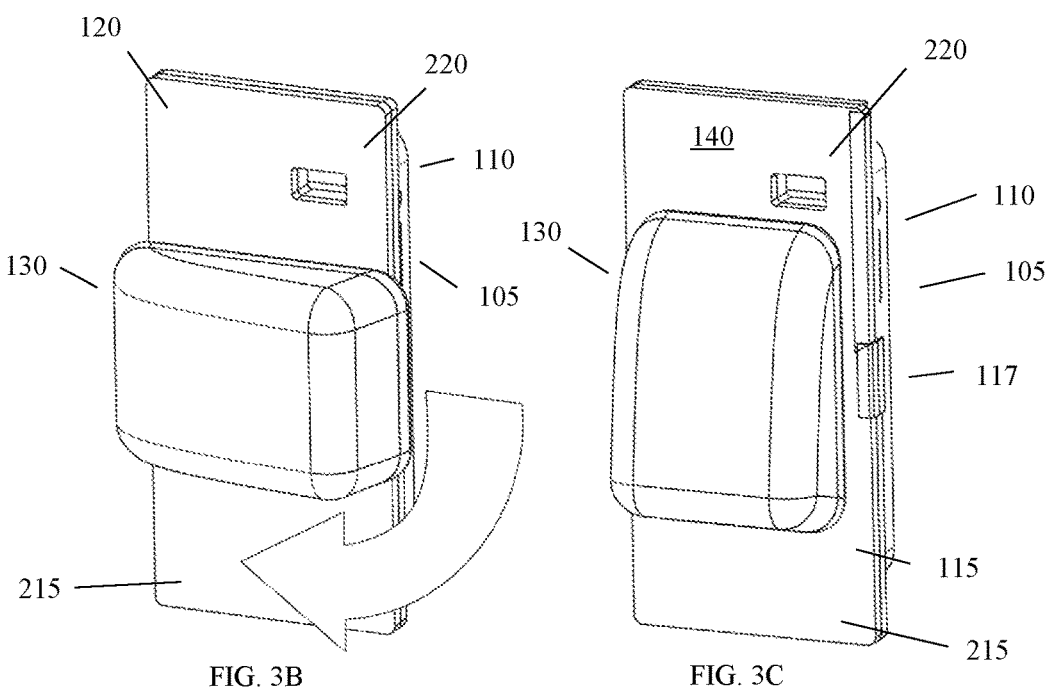
FIG. 3B
FIG. 3C

PORTABLE ELECTRONIC DEVICE ASSEMBLY

CROSS-REFERENCE TO RELATED APPLICATIONS

This application claims the benefit of U.S. Provisional Application No. 62/501,074, titled "Portable Electronic Device Assembly," filed by Jason Hill" on 3 May 2017.

This application incorporates the entire contents of the above-identified application herein by reference.

TECHNICAL FIELD

Various embodiments relate generally to portable protection and storage of electronic devices.

BACKGROUND

Portable electronic devices are mobile electronic systems. People may use portable electronic devices for a variety of purposes including browsing the internet, chat, text messages, viewing video, listening to music, talking on the phone, videoconferencing, or accessing email. Some portable electronic devices may include delicate electronics and sensors, complex computing systems, expensive software applications, or valuable data.

Some portable electronic devices are very expensive. In various examples, a user's portable electronic device may retain sensitive or valuable user data. In some scenarios, portable electronic devices may be subject to damage. A damaged portable electronic device may become unusable because of damage. For example, a user communicating in a chat session on their smartphone while exercising may drop the smartphone. In some examples, a dropped smartphone may be damaged. In some scenarios, a user may lose operational access to the portable electronic device because of damage.

Some users of portable electronic devices may employ accessories when using their device. Some portable electronic device accessories are personal accessories used by only one person. For example, some users may connect headphones, earbuds, or a battery charger to their portable electronic device. In some scenarios, a mobile electronic device user may need to transport their personal earbuds or battery charger along with the device. In some scenarios, a user may misplace accessories, or forget to transport their device accessories along with their device.

SUMMARY

Apparatus and associated methods relate to an electronic device protection module configured with a casing adapted to cushion and removably retain the electronic device, a bi-fold component mechanically coupled with the casing, and a releasable electronic device accessory pouch attaching receptacle disposed in the bi-fold component. In an illustrative example, the electronic device may be a smartphone. The casing may be, for example, elastically deformable, cushioning the smartphone against impact. In some examples, the casing may be configured with openings or buttons to enable device operation. In some designs, the bi-fold component may be configured with pockets adapted to secure currency or cards. In some embodiments, the attaching receptacle may releasably attach an accessory pouch to the bi-fold component. Various examples may advantageously provide portable device protection and enhanced access to the user's device accessories, for example, protecting the user's device and storing the user's accessories in the accessory pouch.

Various embodiments may achieve one or more advantages. For example, some embodiments may improve a user's ease of access to electronic device accessories. This facilitation may be a result of reducing the user's effort locating and accessing the user's accessories stored within an accessory pouch secured with the electronic device. In some embodiments, the user's electronic device may be cushioned against impact damage and may remain operable while cushioned. Such operational protection may reduce the exposure of the user's electronic device to damage.

Some embodiments may enhance user access to cards or currency related to the user's personal or business needs. Such improved access to personal effects may be a result of pockets adapted to secure currency or cards. In some embodiments, the effort required by a user to secure the user's personal electronic device accessories may be reduced. For example, a user who has stored their personal electronic device accessories in the accessory pouch may remove and securely store the pouch. For example, the user may store the accessory pouch in a locked room or safe, after the pouch has been removed. Some embodiments may improve a user's experience viewing their portable electronic device screen. This facilitation may be a result of providing the bi-fold component with high-friction surfaces configured to enable the device to stand against the accessory pouch in a landscape orientation.

The details of various embodiments are set forth in the accompanying drawings and the description below. Other features and advantages will be apparent from the description and drawings, and from the claims.

BRIEF DESCRIPTION OF THE DRAWINGS

FIGS. 2A-2D depict various perspective views of an exemplary portable electronic device protected by an exemplary casing component coupled with an exemplary bi-fold component.

FIGS. 3A-3C depict attachment of an exemplary accessory pouch to an exemplary bi-fold component and casing protecting an exemplary portable electronic device.

Like reference symbols in the various drawings indicate like elements.

DETAILED DESCRIPTION OF ILLUSTRATIVE EMBODIMENTS

Figure 9:
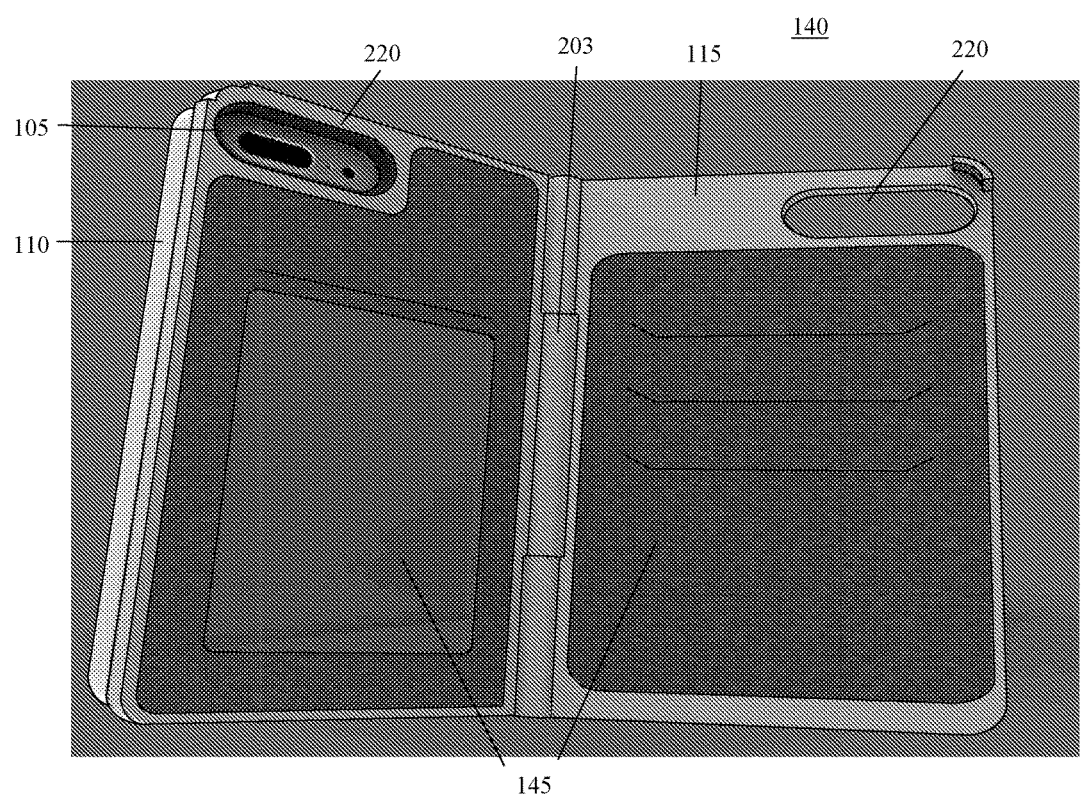
FIG. 9 depicts a perspective view of an exemplary portable electronic device protection module interior depicting exemplary bi-fold component panels rotated open.
Figure 10:
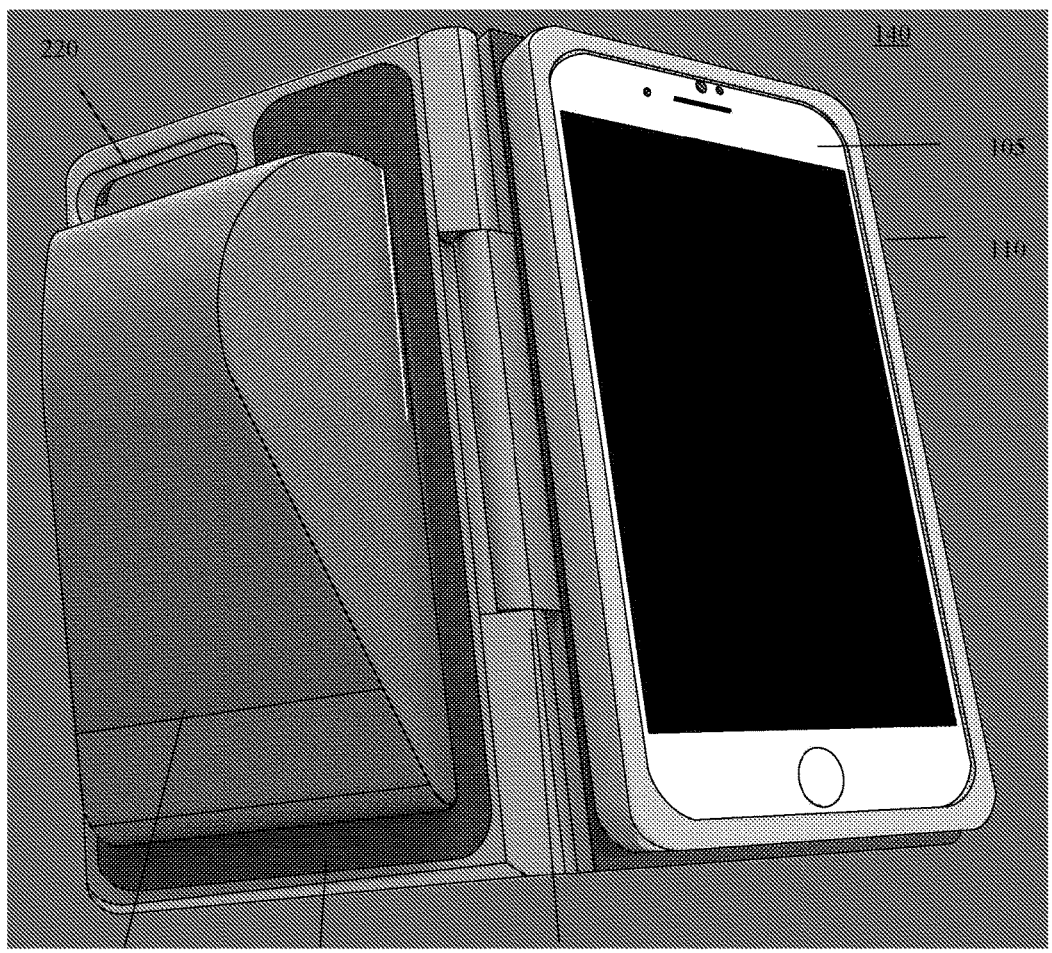
FIG. 10 depicts a perspective view of an exemplary portable electronic device protection module exterior with attached accessory pouch, depicting exemplary bi-fold component panels rotated open.
Figure 11:
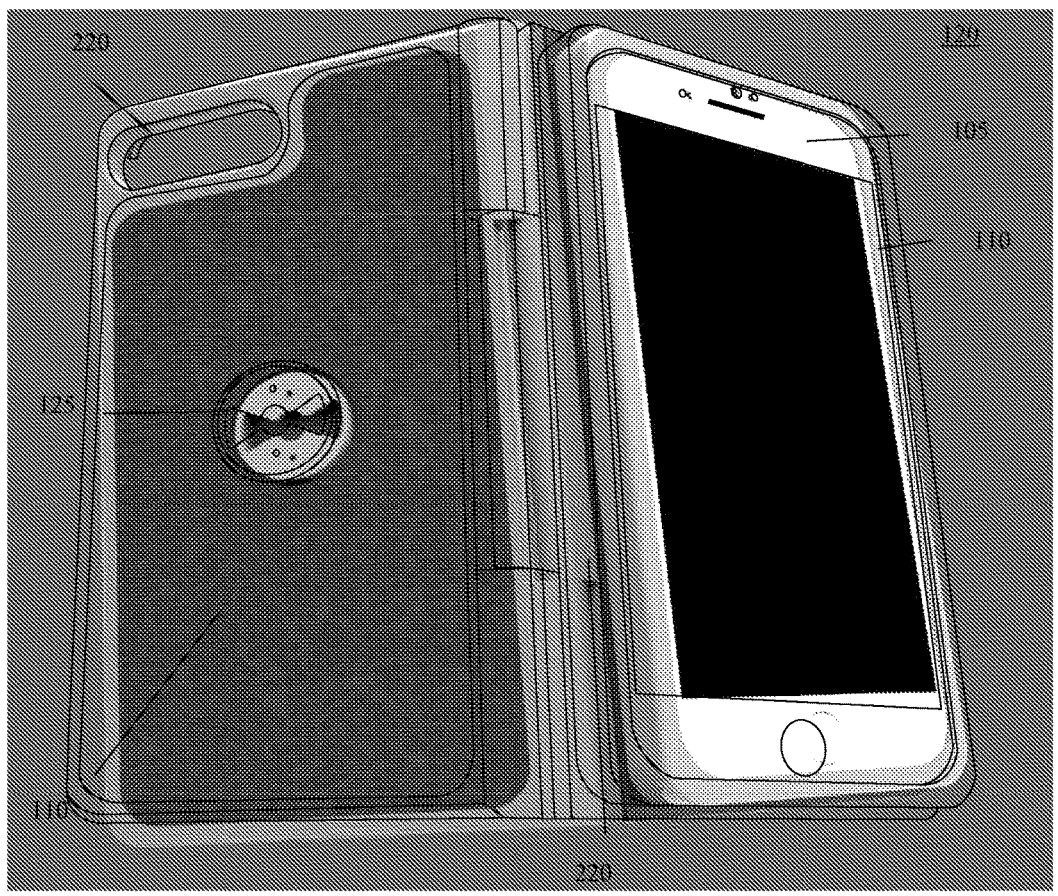
FIG. 11 depicts a perspective view of an exemplary portable electronic device protection module exterior, depicting exemplary bi-fold component panels rotated open, and illustrating an exemplary accessory attaching receptacle disposed in a bi-fold component panel.

To aid understanding, this document is organized as follows. First, an exemplary portable electronic device protection module configured with a casing adapted to cushion and removably retain the electronic device, a bi-fold component mechanically coupled with the casing, and a releasable electronic device accessory pouch attaching receptacle disposed in the bi-fold component, is briefly introduced with reference to FIG. 1. Second, with reference to FIGS. 2-5, the discussion turns to exemplary embodiments that illustrate portable electronic device protection module components. Specifically, illustrative designs of an exemplary casing, bi-fold component, accessory attaching receptacle, and accessory pouch, are disclosed. Then, with reference to FIGS. 6-8, an illustrative design of an exemplary releasable accessory pouch attaching receptacle is disclosed. Finally, with reference to FIGS. 9-11, illustrative views of an exemplary portable electronic device protection module are presented to explain improvements in portable electronic device protection and accessory storage.

In the Summary above and in this Detailed Description, and the claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

Figure 1A:
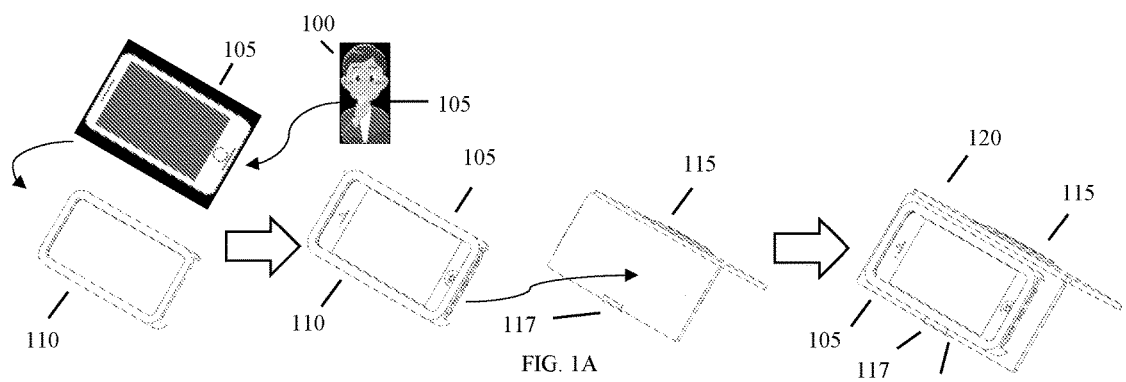
FIGS. 1A-1C depict an illustrative example of a user protecting their portable electronic device with an embodiment device protection module configured with a casing adapted to cushion and removably retain the electronic device, a bi-fold component mechanically coupled with the casing, and a releasable electronic device accessory pouch attaching receptacle disposed in the bi-fold component.
Figure 1B:
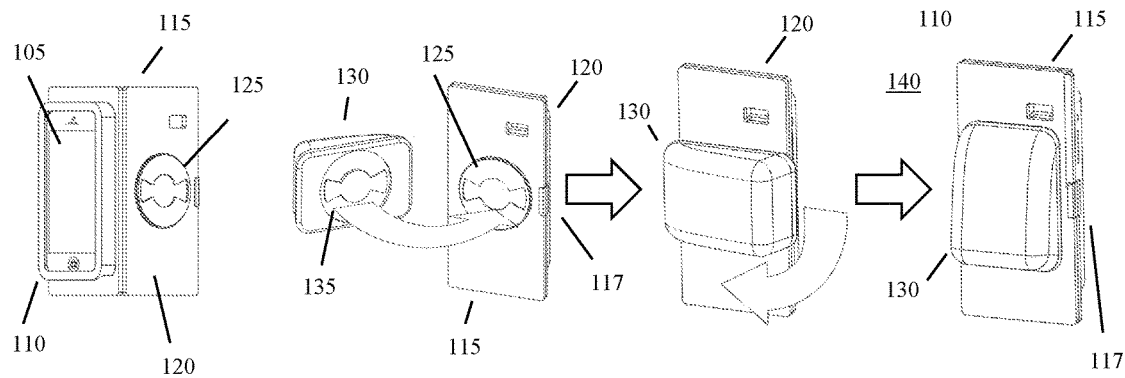
Figure 1C:
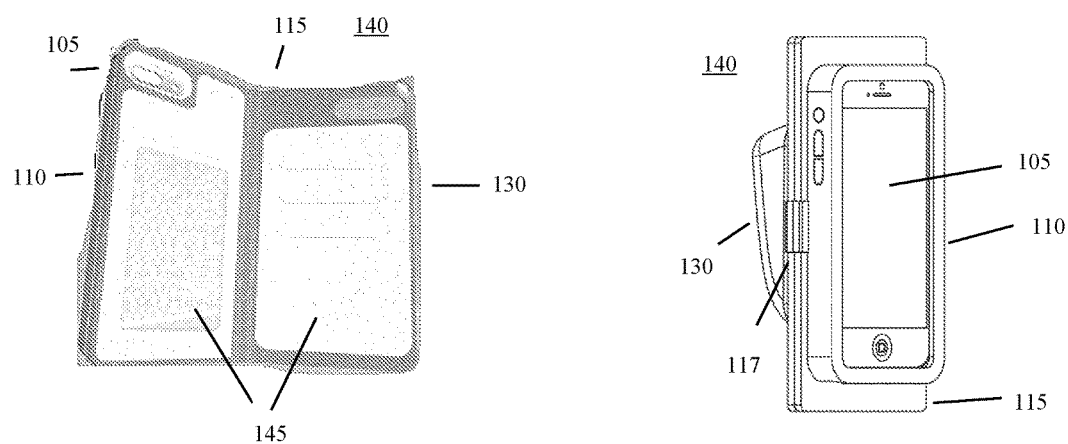

FIGS. 1A-1C depict an illustrative example of a user protecting their portable electronic device with an embodiment device protection module configured with a casing adapted to cushion and removably retain the electronic device, a bi-fold component mechanically coupled with the casing, and a releasable electronic device accessory pouch attaching receptacle disposed in the bi-fold component. In FIG. 1A, the user 100 inserts the portable electronic device 105 into the casing component 110. In the depicted embodiment, the portable electronic device 105 is a smartphone. In some embodiments, the portable electronic device 105 may be a tablet. In various examples, the portable electronic device 105 may be a fitness tracker. In the depicted embodiment the bi-fold component 115 is configured with two panels. In the depicted embodiment, the panels are illustrated as rotated in an open position. In the illustrated embodiment, the bi-fold component 115 panels are securable in a closed position by the snap closure lock 117. The user 100 attaches the smartphone 105 retained within the casing component 110 to the bi-fold component 115 creating the bi-fold portable electronic device protection module 120. In FIG. 1B, the bi-fold portable electronic device protection module 120 is configured with accessory attaching receptacle 125 located in a bi-fold component 115 panel. In the depicted embodiment, the user 100 attaches accessory pouch 130 to the bi-fold portable electronic device protection module 120 by connecting the attaching receptacle 125 to the twist locking component 135 located in the accessory pouch 130 rear surface. In the illustrated embodiment, the user 100 rotationally secures the accessory pouch 130 within the bi-fold component 115 attaching receptacle 125 creating the accessory pouch portable electronic device protection module 140. In FIG. 1C, accessory pouch portable electronic device protection module 140 bi-fold component 115 panels are depicted in an open position providing user 100 access to pockets 145 on the bi-fold component 115 panel interiors. In the illustrated embodiment, the user 100 locks the bi-fold component 115 panels in a closed position using the snap closure lock 117 to secure the portable electronic device protection module 140 for transport.

FIGS. 2A-2D depict various perspective views of an exemplary portable electronic device protected by an exemplary casing component coupled with an exemplary bi-fold component. In FIG. 2A, the bi-fold portable electronic device protection module 120 includes portable electronic device 105 encased in casing component 110 attached to bi-fold component 115. In the depicted embodiment the bi-fold component central fold 203 includes a hinge component enabling the bi-fold component 115 first panel 210 and second panel 215 to rotate about the central fold 203. In the illustrated embodiment, the bi-fold component panels 210 and 215 may be secured in a closed position using the snap closure lock 117. In the depicted embodiment, the casing component 110 includes open section 205 providing operational access to a portable electronic device 105 feature. In FIG. 2B, the bi-fold portable electronic device protection module 120 includes attaching receptacle 125 disposed in a surface of the bi-fold component 115 second panel 215. In the depicted embodiment, the bi-fold component 115 second panel 215 includes open section 220 providing operational access to a portable electronic device 105 feature. In FIG. 2C, the bi-fold portable electronic device protection module 120 is depicted illustrating the bi-fold component panels 210 and 215 secured in an exemplary closed position by the snap closure lock 117. In the illustrated embodiment, the bi-fold portable electronic device protection module 120 includes buttons 225 disposed in a casing component 110 edge, providing operational access to a portable electronic device 105 feature. In FIG. 2D, the bi-fold portable electronic device protection module 120 is depicted illustrating the bi-fold component panels 210 and 215 rotated in an exemplary open position. In the illustrated embodiment, the bi-fold component 115 high-friction side surfaces 230 and 235 prevent the bi-fold portable electronic device protection module 120 from sliding on a flat surface to retain the panel open position.

FIGS. 3A-3C depict attachment of an exemplary accessory pouch to an exemplary bi-fold component and casing protecting an exemplary portable electronic device. In FIG. 3A, the accessory pouch 130 includes accessory pouch rear surface 305, accessory pouch 130 storage pocket 310, and twist locking component 135. In the illustrated embodiment, the bi-fold portable electronic device protection module 120 includes attaching receptacle 125. In the illustrated embodiment, the twist locking component 135 is a "male" twist locking component, and the attaching receptacle 125 is a "female" twist locking component. In some embodiments, the twist locking component 135 may be a "female" twist locking component, and the attaching receptacle 125 may be a "male" twist locking component. In the illustrated embodiment, a user connects the accessory pouch 130 to the bi-fold portable electronic device protection module 120 by connecting the attaching receptacle 125 with the twist locking component 135. In FIG. 3B, a user locks the accessory pouch 130 on the bi-fold portable electronic device protection module 120 by rotating the accessory pouch 130 to an exemplary locked position determined as a function of the mechanical engagement of the attaching receptacle 125 with the twist locking component 135. In FIG. 3C, an exemplary assembled accessory pouch portable electronic device protection module 140 is depicted secured for transport or use of the portable electronic device 105 and accessories.

Figure 4A:
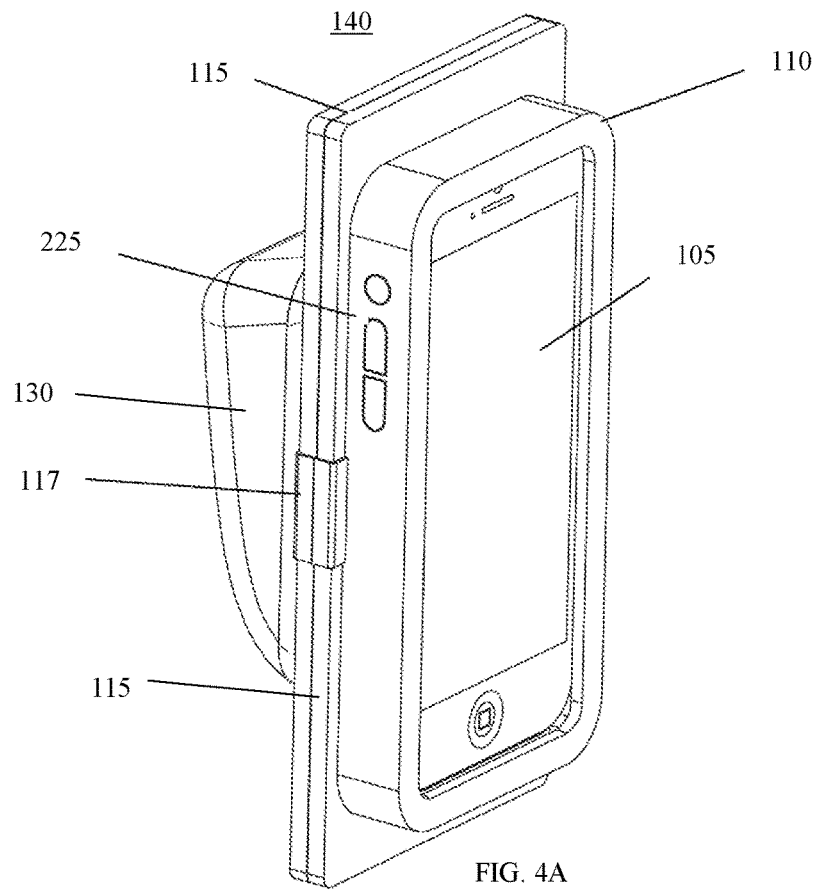
FIGS. 4A-4C depict various perspective views of an illustrative portable electronic device protection module encasing an exemplary portable electronic device within an exemplary casing component coupled with an exemplary bi-fold component having an attached accessory pouch.
Figure 4B:
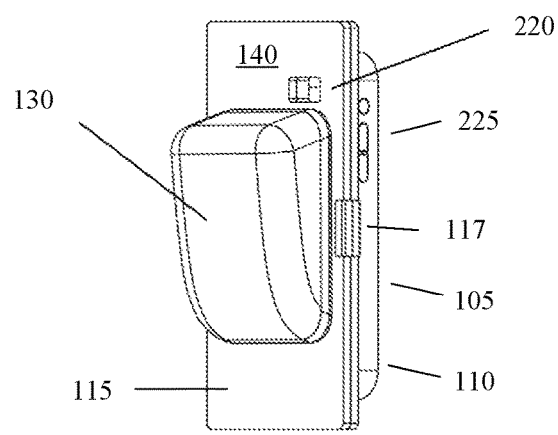
Figure 4C:
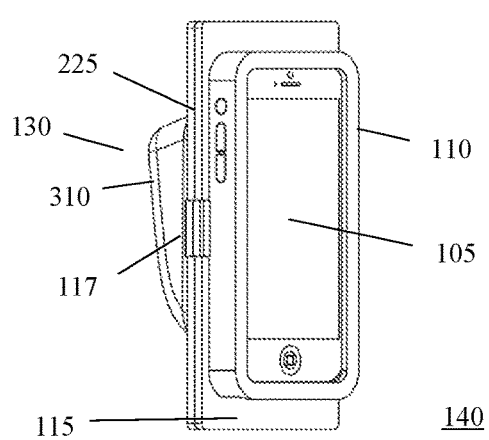

FIGS. 4A-4C depict various perspective views of an illustrative portable electronic device protection module encasing an exemplary portable electronic device within an exemplary casing component coupled with an exemplary bi-fold component having an attached accessory pouch. In FIG. 4A, an exemplary assembled accessory pouch portable electronic device protection module 140 is depicted viewed from the top front with the bi-fold panels in an exemplary closed position. In FIG. 4B, an exemplary assembled accessory pouch portable electronic device protection module 140 is depicted viewed from the rear with the bi-fold panels in an exemplary closed position. In FIG. 4C, an exemplary assembled accessory pouch portable electronic device protection module 140 is depicted viewed from the front with the bi-fold panels in an exemplary closed position.

Figures 5A, 5B:
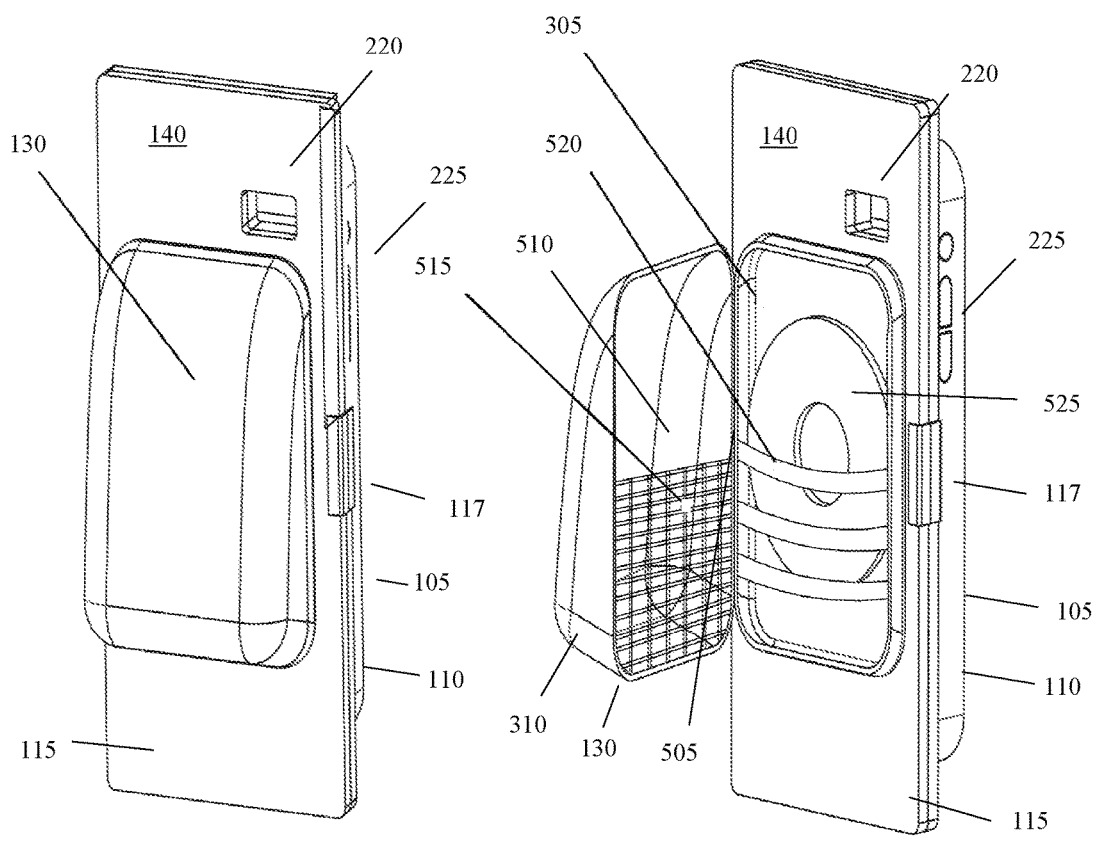
FIGS. 5A-5B depict interior and exterior views of an exemplary accessory pouch attached to an exemplary portable electronic device protection module.

FIGS. 5A-5B depict interior and exterior views of an exemplary accessory pouch attached to an exemplary portable electronic device protection module. In FIG. 5A, an exemplary assembled accessory pouch portable electronic device protection module 140 is depicted viewed from the rear with the bi-fold panels and the accessory pouch 130 in exemplary closed positions. In FIG. 5B, an exemplary assembled accessory pouch portable electronic device protection module 140 is depicted viewed from the rear with the bi-fold panels in an exemplary closed position, and the accessory pouch 130 in an exemplary open position. In the depicted embodiment, the accessory pouch 130 includes accessory pouch 130 rear surface 305 and accessory pouch 130 storage pocket 310. In the illustrated embodiment, the accessory pouch 130 storage pocket 310 is rotationally coupled with the accessory pouch rear surface 305 by the hinge 505. In the illustrated embodiment the accessory pouch 130 storage pocket 310 has rotated to an exemplary open position, revealing the storage pocket 310 interior 510. In the depicted embodiment, the storage pocket 310 interior 510 is configured with mesh netting 515 to retain accessories within the storage pocket 310. In the illustrated embodiment, the accessory pouch 130 rear surface 305 is configured with straps 520 to retain accessories 525 within the accessory pouch 130.

Figure 6A:
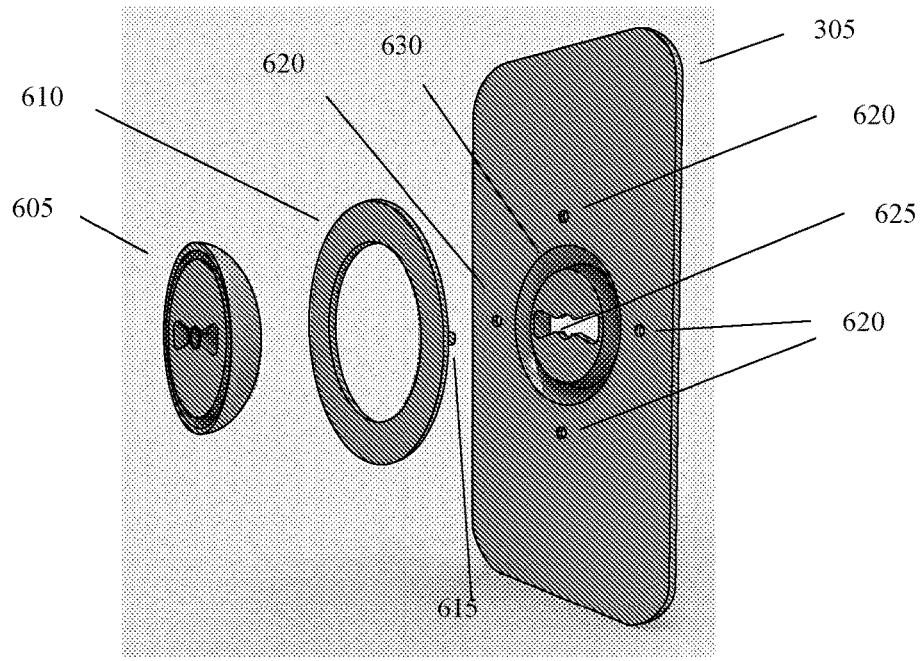
FIGS. 6A-6B depict perspective views of an exemplary accessory pouch rear surface.
Figure 6B:
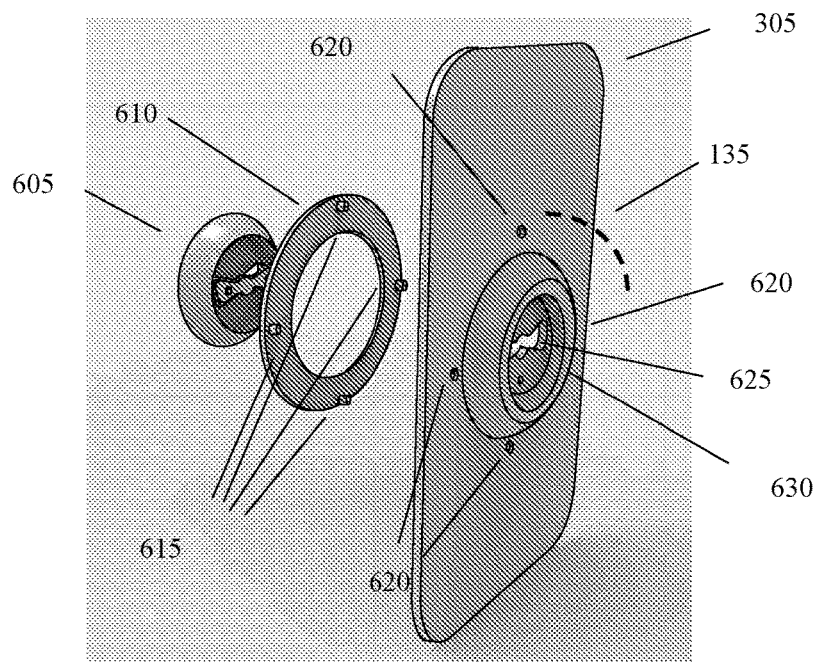

FIGS. 6A-6B depict perspective views of an exemplary accessory pouch rear surface. In FIG. 6A, the front of the exemplary accessory pouch rear surface 305 is depicted as viewed from within the accessory pouch looking toward an attached bi-fold component panel. In FIG. 6A, the exemplary twist lock key 605 is rotationally coupled to the rear surface 305 via twist lock securing ring 610, attachment pins 615, attachment sockets 620, central twist lock aperture 625, and twist lock channel 630. In FIG. 6B, the rear of the exemplary accessory pouch rear surface 305 is depicted as viewed from outside the accessory pouch looking toward the inside of an attached storage pocket. In FIG. 6B, an exemplary "male" twist locking component 135 is formed upon completion of the indicated assembly by the twist lock key 605 protrusion through the central twist lock aperture 625.

Figure 7:
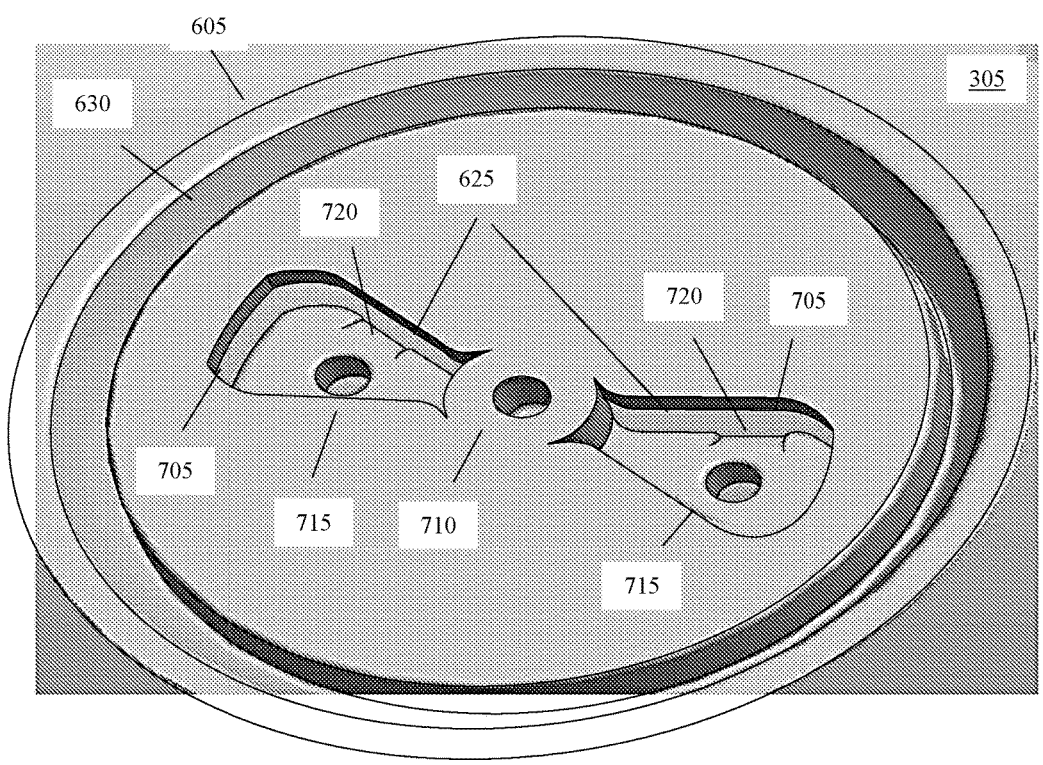
FIG. 7 depicts a perspective view of an exemplary twist-lock.

FIG. 7 depicts a perspective view of an exemplary twist-lock. In FIG. 7, the front of the exemplary twist lock 605 is depicted as viewed from within the accessory pouch looking toward an attached bi-fold component panel, as in FIG. 6A. In the illustrated embodiment, the exemplary twist lock 605 includes twist lock key apertures 705, central twist lock socket 710, side twist lock sockets 715, and key engagement grooves 720. In the depicted embodiment, the key engagement grooves 720 include a portion of the key engagement groove 720 surface configured at an angle sharper than the remainder of the key engagement groove surface.

Figure 8:
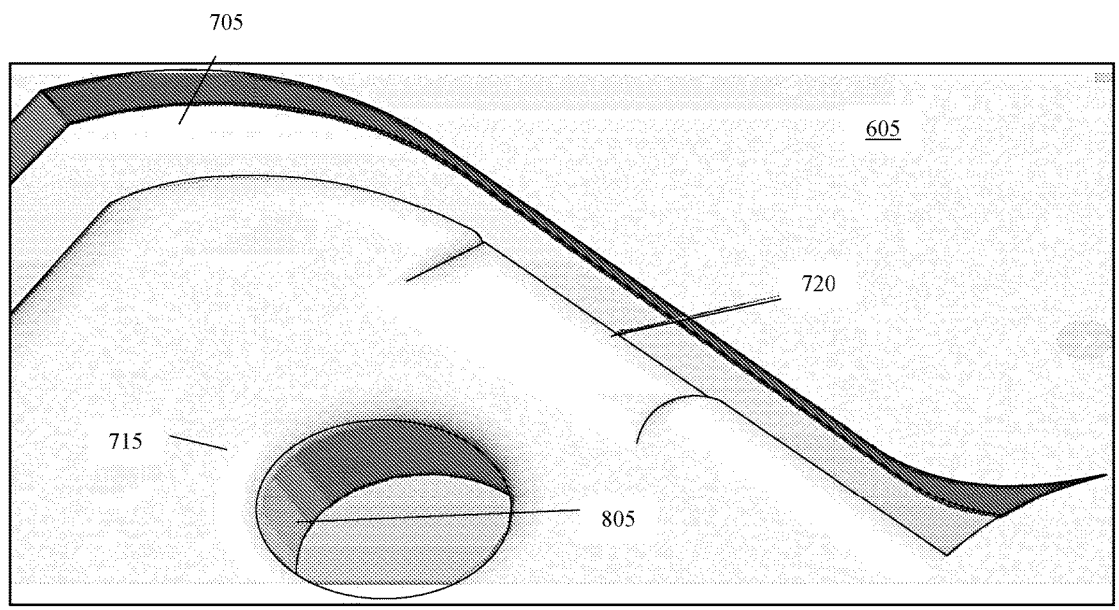
FIG. 8 depicts a detail perspective view of an exemplary twist-lock.

FIG. 8 depicts a detail perspective view of an exemplary twist-lock. In FIG. 8, the side twist lock socket 715 is configured with multiple flat section 820 edges disposed around the inner circumference of each side twist lock socket 715. In the depicted embodiment, the key engagement grooves 720 include a portion of the key engagement groove 720 surface configured at an angle sharper than the remainder of the key engagement groove surface.

FIG. 9 depicts a perspective view of an exemplary portable electronic device protection module interior depicting exemplary bi-fold component panels rotated open.

FIG. 10 depicts a perspective view of an exemplary portable electronic device protection module exterior with attached accessory pouch, depicting exemplary bi-fold component panels rotated open.

FIG. 11 depicts a perspective view of an exemplary portable electronic device protection module exterior, depicting exemplary bi-fold component panels rotated open, and illustrating an exemplary accessory attaching receptacle disposed in a bi-fold component panel.

Although various embodiments have been described with reference to the Figures, other embodiments are possible. In an illustrative example, various embodiments relate to portable electronic devices, and more particularly, to an assembly for protecting an electronic device as well as storing accessories and peripherals.

Portable electronic devices have become a staple of modern day society. From toddlers to senior citizens, every person can now be found with one in various scenarios. Whether using the GPS on a phone to find your way around town, reading a book on a Kindle while flying, or teleconferencing with work when on vacation, portable electronic devices have become invaluable for everyday activities. Even though portable electronic devices have become more advanced and self-contained, the devices still require added protection and peripheral devices to operate. Headphones are useful to listen to music without disturbing others, a portable charger may be needed when using more strenuous applications for extended periods of time, and cords may be necessary to stream photos or videos from portable electronic devices to a separate device such as a television. In illustrative usage scenarios, exemplary prior art electronic assemblies may not include a way to protect the device as well as carry accessories and those that do are found to be too cumbersome or complex. An absence of these products in some scenarios exemplary of prior art have led users to place accessories in their pockets or in a separate backpack where they can become entangled, lost, or damaged.

It is an object of various embodiments of the present invention to provide a portable electronic device assembly. In various embodiments, the portable electronic assembly includes a portable electronic device, a casing, a bi-fold component, and a pouch that may be used for storing accessories or other peripherals.

It is an object of various embodiments of the present invention to provide a portable electronic device assembly including a casing, which is capable of protecting a portable electronic device. In some embodiments, the casing includes a back surface and plurality of side surfaces connecting to the back surface. In some examples, the casing is composed of a material that is capable of elastic deformation so that the casing may be stretched, and a portable electronic device may be inserted into the casing wherein the casing will return to its normal shape, properly securing the portable electronic device in place.

It is an object of various embodiments of the present invention to provide a portable electronic device assembly including a bi-fold component, which is attached to the casting. In some embodiments, the bi-fold component is composed of two panels each foldable about a central fold. In various embodiments, each panel consists of an inside surface and an outside surface and a plurality of side surfaces. In some designs, the inside surfaces have a plurality of pockets so that credit cards, personal identification cards, and paper money may be held in different divisions wherein when the panels are oriented parallel to each other, the contents in the pockets will not be visible. In various implementations, the side surfaces may have high friction surfaces so when the panels are arranged at a specific angle in relation to one another the device can stand on a flat surface with the portable electronic device in landscape orientation, thereby allowing the user to view the screen while the portable electronic device is mounted within casing.

It is an object of various embodiments of the present invention to provide a portable electronic assembly including an accessory pouch that can be connected to the outside panel of the bi-fold component. In various implementations, the pouch in combination with the bi-fold component may have a key-locking mechanism so the accessory pouch may be easily attached and removed from the rest of the assembly. In an illustrative example, the pouch may be customized and have multiple variations to meet the specific needs of the user.

In various implementations, as illustrated in FIGS. 2A-2D, the bi-fold component 115 panels 210 and 215 may be rotated to a specific angle wherein the side surfaces of the panels, having very high friction surfaces, maintain the portable device at an angle suitable for a user to view the device. In some designs, as depicted in FIGS. 3A-3C, the "male" twist-locking component 135 of the accessory pouch 130 may connect to the "female" twist-locking component 125 of the bi-fold component 115 and be locked in place with a rotational turn of the accessory pouch 130. In some embodiments, the completed portable electronic device assembly 140 may include portable device 105, casing component 110, bi-fold component 115, and accessory pouch 130, as illustrated in FIG. 3C and FIGS. 4A-4C. In some implementations, as depicted in FIGS. 5A-5B, an accessory pouch 130 may be configured with retaining mesh, loops, or straps disposed inside of the accessory pouch 130.

Referring to the figures, FIGS. 4A, 4B, and 4C depict an embodiment completed portable electronic device assembly 140 comprised of a portable electronic device 105, a casing component 110, a bi-fold component 115, and an accessory pouch 130. The portable electronic device 105 may be a personal digital assistant, a cell phone, an electronic reader, a tablet device, electronic gaming device or other related gaming paraphilia, an internet browsing device, a portable computer, or any other type of portable consumer electronic device. Embodiments in accordance with the present invention can be applied to several modifications of assemblies as they pertain to numerous other portable electronic devices. For illustration purposes though, an embodiment in accordance with the present invention is shown as a cell phone although other devices would employ similar details, features and benefits.

With reference to the figures, in some embodiments, the portable electronic device 105 may be inserted into the casing component 110. In various embodiments, the casing component 110 may have a back surface and a plurality of side surfaces connected to the back surface. In some embodiments the casing component 110 may have front surfaces connected to the side surfaces wherein the front surfaces may cover the bezel portions of the portable electronic device 105. In various implementations, the casing component 110 may be composed of a flexible material capable of elastic deformation wherein when a sufficient force is applied, the casing component 110 may have a temporary change in shape that is self-reversing after the force is removed, so that the casing component 110 substantially returns to its original shape. In some examples, the flexible material of the casing component 110 allows easy insertion of the portable electronic device 105 by providing a means to stretch the casing component 110 to facilitate insertion of the portable electronic device 105. Conversely, in various embodiments, the flexible design of the casing component 110 also allows for easy removable of the portable electronic device 105 by providing a means to stretch the casing component 110 away from the portable electronic device 105 thereby providing access to the portable electronic device 105 for removal. In some implementations, the casing component 110 may be designed to adapt to the model specifications of a particular portable electronic device 105 based on wrapping tightly around the exterior of the portable electronic device 105. In some embodiments the casing component 110 may have a back surface and a plurality of corner sections connected to the back surface wherein the portable electronic device 105 may be held in place by the corner sections while the remaining portion of the front and side surfaces of the portable electronic device 105 are left exposed.

In some embodiments, an open section or hole 205 or 220 may be located anywhere in the casing component 110 to expose features on the portable electronic device 105 such as a camera lens, flash, charging port, headphone jack, power button, volume control, or any other features of portable electronic device 105 which are desired to be exposed in order for those features to work or to access those features. The open section 205 or 220 is not limited to the location illustrated in FIG. 2A or 3A but may be moved in various embodiments to provide exposure of any the portable electronic devices 105 features desired to be exposed. The casing component 110 may also feature appropriate buttons 225 as depicted in FIG. 4A, in addition to open sections or instead of open sections to allow interaction with the portable electronic device 105. For example, the casing component 110 may have a volume control button 225 wherein when the volume control button 225 is pressed the portable electronic device 105 button will also be pressed.

In some embodiments the casing component 110 may be comprised of an inner case and outer case wherein the outer case may be composed of a more rigid material to provide structural stiffness to the case and added resistance to drops, blunt force, or sharp objects. In alternate embodiments, the casing component 110 may be separated into different segments wherein one segment may be detached from the casing component 110 so that the portable electronic device 105 may be inserted into the casing component 110 and then the detached segment is reattached, maintaining the portable electronic device 105 in place within the casing component 110. In some embodiments, the portable electronic device 105 may be removed by once again by removing the detachable segment from the casing component 110 allowing the portable electronic device 105 to be removed. In further alternate embodiments, the casing component 110 may have a hatch on one of the side surfaces wherein the hatch may open allowing the portable electronic device 105 to be inserted into the casing component 110. In some designs, the hatch then may be closed keeping the portable electronic device 105 in position within the casing component 110. In various implementations, the hatch may be opened once again to remove the portable electronic device 105 from the casing component 110. In various embodiments, the casing component 110 may be attached to a bi-fold component 115. In some embodiments, the casing component 110 and the bi-fold component 115 may be connected by adhesive, magnets, buttons, snaps, latches, locking mechanisms, or other means. In some embodiments the casing component 110 may be separated and reattached to the bi-fold component 115. In some embodiments, the bi-fold component 115 includes two panels, panel 210 and panel 215, made of a flexible enough material wherein the panels 210 and 215 may be angularly around a central fold 203 wherein the first panel 210 and the second panel 215 may be symmetric around the central fold 203. In various embodiments, the first panel 210 and the second panel 215 may be oriented generally parallel to each other and layered adjacent to each other, such that the perimeter of the first flexible panel 210 and the perimeter of the second flexible panel 215 may appear to be coincident with each other when such embodiments of the present invention are viewed perpendicularly to the first flexible panel 210 or the second flexible panel 215. A snap closure lock 117 may be attached to one of the panels 210 or 215 wherein when the panels 210 and 215 are arranged in parallel, the snap closure 117 lock may be moved on top of the second panel to lock in the second panel to keep the panels 210 and 215 parallel to each other.

In a preferred embodiment, the first panel 210 and the second panel 215 may be rectangular in shape but may also be in a different shape. In some embodiments, the first and second panels 210 and 215 may have a rigid section within the panels to provide sturdiness, support, and added durability to the elements. In a preferred embodiment, the panels 210 or 215 may be made up of semi rigid plastic sheet wrapped in leather. In some embodiments, an open section or hole 220 may be located anywhere on a panel 210 or 215 aligned to the open sections 220 of the casing component 110 to expose features on the portable electronic device 105 such as a camera lens, flash, or any other features of portable electronic device 105 which are desired to be exposed in order for those features to work. The first and second panels 210 and 215 may include an inside surface and an outside surface and a plurality of side surfaces connected to the outside and inside surface. The casing component 110 may be attached to the outside surface of the first panel 210. In some embodiments, the inside surfaces of one or two of the panels 210 and 215 may have a plurality of pockets so that credit cards, personal identification cards, and paper money may be held in different divisions wherein when the panels 210 and 215 are oriented parallel to each other the contents in the pockets will not be visible. In some embodiments, a money clip may be attached to the inside surface of one or two of the panels 210 and 215. In further embodiments, other apparatuses may be attached to the inside surface of one or two of the panels 210 and 215. As depicted in FIGS. 2A, 2B, 2C, and 2D, in some embodiments, the side surfaces 230 and 235 on one or two of the panels 210 and 215 may have high friction surfaces wherein when the panels are arranged at a specific angle wherein the side surfaces 230 and 235 come in contact with an outside surface such as a flat surface the high friction surface will prevent movement of the portable electronic device assembly. In an illustrative example, a user may angle the portable electronic device assembly wherein the vertical side surfaces 230 and 235 of two of the panels 210 and 215 come into contact with the flat surface of the table thus enabling the user to watch the portable electronic device 105 mounted within casing component 110 in landscape view at an optimal viewing angle relative to their body position. In alternate embodiments, the bi-fold component 115 may be replaced by a one-panel component that may connect to the casing component 110 and the accessory pouch 130. In further alternate embodiments, the bi-fold component 115 may be comprised of more than two panels with multiple folds that the panels may be folded upon.

In some embodiments, the outside surface of the second panel 215 may be connected to the accessory pouch 130. In various embodiments, the accessory pouch 130 may include a rear surface 305 and a storage pocket 310 coupled to the rear surface 305. In various embodiments, the accessory pouch 130 may be made of folded or trimmed sheets of plastic covered by fabric but may include different material for different circumstances. In some embodiments, the rear surface 305 may have an open section or hole wherein a "male" twist locking component 135 may be attached to the sheet plastic located within the rear surface 305. In alternate embodiments, the "male" twist locking component 135 may be attached to the outside of the fabric located on the rear surface 305. FIGS. 3A, 3B, and 3C depict how the bi-fold component 115 and accessory pouch 130 may be connected via the "male" twist locking component 135 with the "female" twist locking component 125 located on the outside surface of the second panel 215 of the bi-fold component 115. In the depicted embodiment, the "male" twist locking component 135 is inserted into the receptacle of the "female" twist locking component 125 wherein the accessory pouch 130 is rotated 90° clockwise or, in some embodiments, counter clockwise so that it cannot be withdrawn until the "male" twist locking component 135 and "female" twist locking component 125 are once again aligned. In alternate embodiments the "male" twist-locking component 135 may be on the outside surface of the second panel 215 and the "female" twist locking component 125 may be on the rear surface of the accessory pouch 130. In alternative embodiments the bi-fold component 115 and the accessory pouch 130 may be coupled together by different types of locks, latches, snaps, or other locking means. In further alternate embodiments, the accessory pouch 130 may be replaced by another accessory such a portable battery, portable speaker, or professional camera or flash upgrades wherein the "male" twist-locking component 135 may be located on one surface of the above-mentioned accessories.

In various embodiments, the rear surface 305 is essentially a panel that is hinged to the remainder of the accessory pouch 130 by a hinge portion and is divided from the remainder of the accessory pouch 130 by an opening that is substantially U-shaped. In some embodiments, a zipper secures the opening. In some designs, the zipper may have a portion or complementary half of the zipper attached to the rear surface 305 and a portion or complementary half of the zipper attached to the storage pocket 310. In some embodiments, the zipper portions may detach from each other and attach to each other through the action of sliders in order to open and close the opening. In alternate embodiments, the rear surface 305 may be connected to the remainder of the accessory pouch 130 by other means such as a latch, adhesive, magnets, or other connective means. FIG. 5B depicts the inside surfaces of an exemplary accessory pouch 130 which may have a multitude of bands or nettings attached to the inside surface to store accessories such as headphones, cords, or other apparatuses.

In some alternative embodiments there may be no bi-fold component 115 and the casing component 110 may be directly coupled with the accessory pouch 130, wherein a "male" twist locking component 135 attached to the outside of the fabric located on the rear surface 305 which attaches to a "female" twist locking component 125 attached or built into the back surface of the casing component 110. In alternative embodiments the casing component 110 and accessory pouch 130 may be coupled together by other locking means.

In various embodiments an exemplary portable electronic device assembly may include: a casing component, including a front, a back, and plurality of sides; an accessory pouch, including a rear surface and storage pouch; and, one or more panels coupled to the casing component and accessory pouch.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art as nonsensical. Likewise, use of the singular and plural is solely for the sake of illustration and is not to be interpreted as limiting.

In the present disclosure, all embodiments where "comprising" is used may have as alternatives "consisting essentially of," or "consisting of." In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an article "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)," this means a range whose limit is the second number. For example, 25 to 100 mm means a range whose lower limit is 25 mm and upper limit is 100 mm.

Many suitable methods and corresponding materials to make each of the individual parts of embodiment apparatus are known in the art. According to an embodiment of the present invention, one or more of the parts may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as described herein-above may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f).

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. An apparatus, comprising:
a portable electronic device protection module, comprising: a casing component, comprising:
a substantially planar base structure section in mechanical union with a plurality of substantially planar side structure sections disposed at substantially right angles to the base structure section;
a bi-fold component, comprising:
a plurality of substantially planar bi-fold component structure sections configured to open and close with a clamshell opening and closing action based on a bi-fold component structure section rotating about a hinge axis longitudinally disposed along a bi-fold component structure section edge; and,
an accessory attaching receptacle disposed in a bi-fold component structure section surface and configured to releasably attach an electronic device accessory pouch to the protection module.

2. The apparatus of claim 1,
wherein the casing component further comprises a material capable of elastic deformation.

3. The apparatus of claim 1,
wherein the bi-fold component further comprises a high-friction bi-fold component panel side surface.

4. The apparatus of claim 1,
wherein the apparatus further comprises an accessory pouch connected with the accessory attaching receptacle.

5. The apparatus of claim 4,
wherein the accessory pouch further comprises a key-locking mechanism.

6. The apparatus of claim 5,
wherein the key-locking mechanism further comprises a twist-lock.

7. The apparatus of claim 1,
wherein the casing component further comprises a hatch adapted to permit removable insertion of the portable electronic device.

8. An apparatus, comprising:
a portable electronic device protection module, comprising: a casing, comprising:
a substantially planar base structure section in mechanical union with a plurality of substantially planar side structure sections disposed at substantially right angles to the base structure section;
a bi-fold component, comprising:
two substantially planar bi-fold component structure sections configured to open and close with a clamshell opening and closing action based on a bi-fold component structure section rotating about a hinge axis longitudinally disposed along a bi-fold component structure section edge;
an accessory attaching receptacle disposed in a bi-fold component structure section surface and configured to releasably attach an electronic device accessory pouch to the protection module; and,
an electronic device accessory pouch releasably coupled with the accessory attaching receptacle and configured to retain within the accessory pouch a portable electronic device accessory.

9. The apparatus of claim 8, wherein the casing component further comprises a material capable of elastic deformation.

10. The apparatus of claim 8, wherein the bi-fold component further comprises a high-friction bi-fold component panel side surface.

11. The apparatus of claim 8, wherein the bi-fold component further comprises an aperture adapted to expose a feature of the portable electronic device.

* * * * *